United States Patent Office 3,524,891
Patented Aug. 18, 1970

3,524,891
BORIC ACID OXIDATION PROCESS
Robert P. Cahn, Millburn, N.J., assignor to Esso Research and Engineering Company, a corporation of Delaware
Continuation-in-part of application Ser. No. 303,122, Aug. 19, 1963. This application Nov. 7, 1967, Ser. No. 681,143
Int. Cl. C07c 35/02, 35/08, 55/04
U.S. Cl. 260—617
13 Claims

ABSTRACT OF THE DISCLOSURE

Saturated feeds, prepared by the hydrogenation of olefins or as paraffin extracts, are oxidized in the presence of boric acid to produce borate esters, the latter being separated from the reaction product by flashing; the borate ester recovered as bottoms is hydrolyzed to produce alcohols, while the overhead is hydrogenated, in conjunction with the saturated feed, and recycled to the oxidation stage, the alcohols prepared thereby being useful in the preparation of dibasic acids for use in polymerization reactions, or sulfonates for detergents.

CROSS REFERENCE

Figure 1:
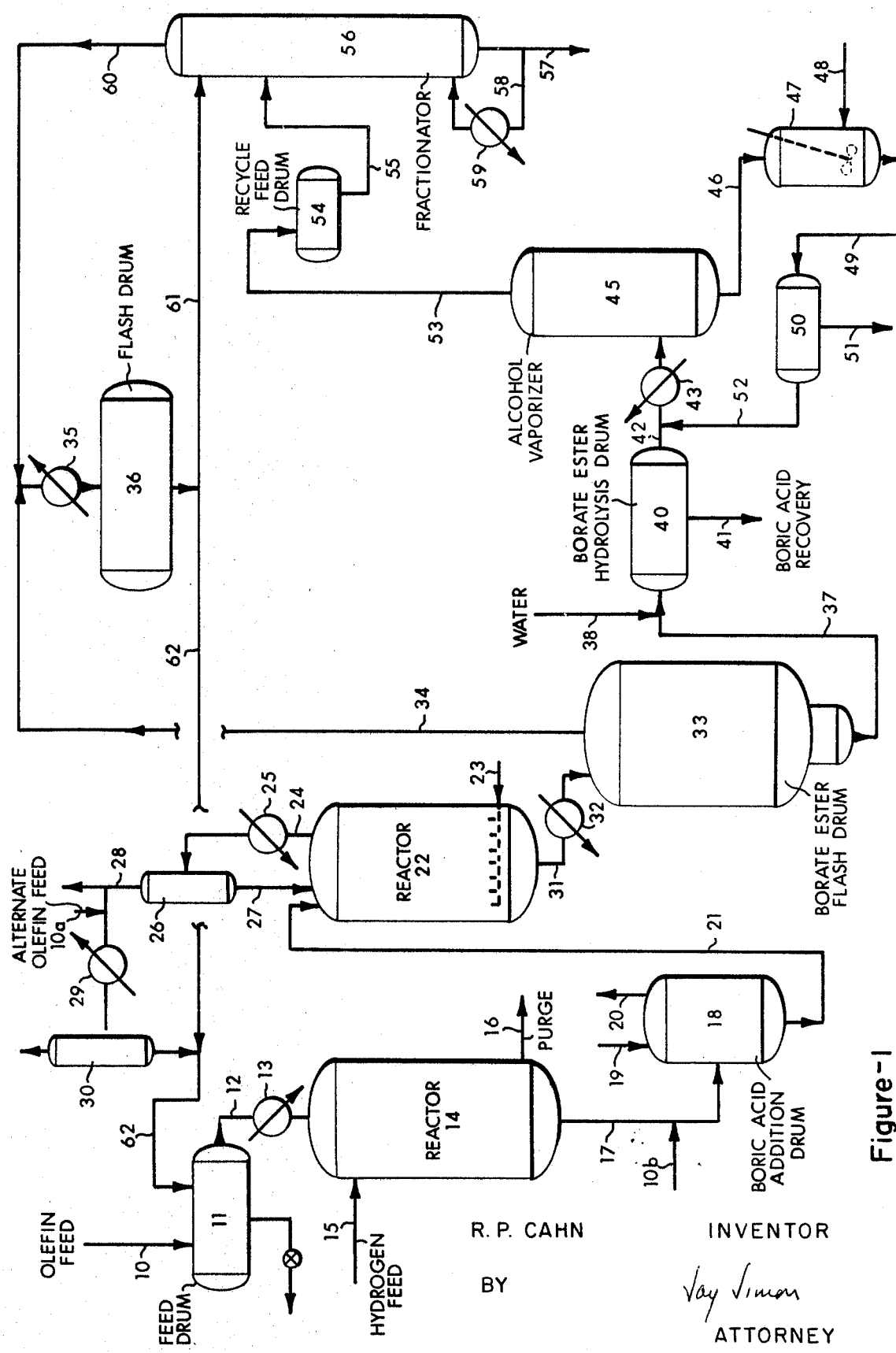

This application is a continuation-in-part of copending application Ser. No. 303,122, filed Aug. 19, 1963 and now abandoned.

FIELD OF INVENTION

This invention relates to a process for preparing alcohols and more particularly to a process for preparing relatively high molecular weight alcohols which may be sulfonated to form high quality detergents or further oxidized to form carboxylic acids. In a specific preferred embodiment, this invention relates to the production of cyclic alkanols from cyclic dimers and trimers of conjugated diolefins such as butadiene-1,3 by hydrogenating these dimers and trimers to the corresponding cycloparaffins, oxidizing the latter with molecular oxygen, e.g., air, in the presence of a boric acid compound, vacuum flashing the oxidation product to separate unoxidized cycloparaffins and cycloalkanones from the boric acid esters of the cycloalkanols, recycling the overhead comprised of cycloparaffins and cycloalkanones to the hydrogenation step to convert the latter to cycloalkanols, to control the temperature in the hydrogenation reactor, to increase product quality, and reduce the effect of oxidation inhibitors, and hydrolyzing the boric acid esters of the cycloalkanols to recover the cycloalkanols. The latter may then be further oxidized, e.g., with nitric acid advantageously to produce dibasic acids. The alpha, omega–$C_8$–$C_{12}$ diacids obtained in this way are extremely useful in the preparation of polyester or polyamide type plastics in view of their high degree of purity.

PRIOR ART

It has been proposed to prepare alpha, omega-dodecanedioic acid by first hydrogenating 1,5,9-cyclododecatriene to cyclododecane which is then fed into an air oxidation zone together with excess boric acid. Conversion to oxygenated compounds is held at about 8–15% to keep selectivity to the desired cyclododecanol and cyclododecanone products up around 88–92%. The oxidation reactor effluent is first hydrolyzed to recover the boric acid, then caustic and water washed to saponify any esters and fed to a 50-plate vacuum distillation tower in which unconverted cyclododecane is taken overhead for recycle. The bottoms product from this vacuum distillation consists principally of cyclododecanol and cyclododecanone and is passed on to the nitric acid oxidation step. This process has a number of serious disadvantages. In the first place with low (10–15%) conversion per pass in an air oxidation zone a large diameter vacuum distillation tower with about 50 plates is required to effect the separation of unreacted cyclododecane from the cyclododecanol and cyclododecanone and the lower the conversion the larger the tower diameter becomes. Moreover in this operation the borate ester hydrolysis has to be carried out on a large volume of total reactor effluent and the feed to the nitric acid oxidation obtained from the aforesaid vacuum distillation tower will be a mixture of about 85% cyclododecanol and about 15% cyclododecanone which presents process disadvantages.

SUMMARY OF THE INVENTION

In accordance with the present invention, the large diameter vacuum distillation tower is replaced by a single, small diameter packed tower preceded by a vacuum flash drum in which the oxidation reactor effluent is vacuum flashed to remove overhead the unreacted alkane or cycloalkane, e.g., cyclododecane, and its corresponding ketone, e.g., cyclododecanone. The products removed overhead are recycled to a hydrogenation reactor where the ketone is reduced to alcohol, the recycled alkane serves to dilute the olefinic or paraffinic feed in the hydrogenation reactor thereby assisting in the control of the temperature in this reactor, reducing any olefins generated during the flash, and when hydrogenation of the recycle is effected in conjunction with the saturated feed, oxidation inhibitors in the feed are reduced. The bottoms from the vacuum flashing drum consisting only of the alkanol borate ester and a small amount of residual alkane is subjected to hydrolysis thus substantially reducing the volume of material handled in this step. Thus, while the prior art has taught that the ketones be separated from unreacted paraffin (thereby necessitating large distillation equipment), this invention now proposes that this separation is unnecessary, due to the hydrogenation of the recycle, since the alcohol formed from recycled ketone is protected from further oxidation by boric acid, whereas recycled ketone would degrade in the oxidation reactor. Thus, the ketone/paraffin separation is entirely avoided and the alcohol/paraffin separation is reduced to a simple flash. Therefore, the overall process separation requirements are reduced from conventional distillation to simple flashing; and, allows the use of a wide boiling range feed which could not be used if distillation of close boiling paraffins, alcohols and ketones were required.

Upon distillation of the hydrolysis product, a feed stream for charging to the nitric acid oxidation step is obtained which will be practically pure or about 98% alkanol, e.g., cyclodecanol. Moreover, with a very small increase in investment the conversion in the air oxidation step can be reduced to about 5 to 8% which should further improve selectivities to alkanol (maybe 95%+) and may also obviate the need, from an economic point of view, for ester saponification since little acid, and hence ester, will be formed at these low conversions.

Reference is made to the accompanying drawing illustrating diagrammatically, a flow plan of the process in accordance with an embodiment of the present invention.

In the drawing, olefinic feed is supplied through line 10 to hydrogenation feed drum 11 where it is mixed with recycle comprising unoxidized hydrocarbon and ketone product supplied via line 62 as will hereafter be described. Alternately, if the feed is cyclododecatriene, it may be introduced via line 10a as will be discussed below. Further, a paraffinic feed may be introduced via line 10b, into the hydrogenated product transfer line 17, since it need not go through the hydrogenation reactor 14 unless it contains hydrogenatable impurities. The mixed hydrogenation feed is charged via line 12 through preheater 13 into hydrogenation reactor 14 which is charged with a suitable hydrogenation catalyst and maintained under active hydrogenation conditions. Hydrogen or a hydrogen-containing gas is supplied to reactor 14 through line 15. In the bottom of the reactor 14 the hydrogenated liquid products are separated from unreacted hydrogen and vaporous impurities and the latter are removed through purge line 16. The hydrogenated liquid products are withdrawn from reactor 14 and charged via transfer line 17 to boric acid addition drum 18. Boric acid or a compound which yields boric acid is supplied in solid form or in solution to drum 18 via line 19. If the boric acid or boric acid yielding compound is supplied in aqueous solution for convenience in handling, the sensible heat in the liquid hydrogenation product will suffice to vaporize the water in which the boric acid compound is dissolved, the water vapor being withdrawn from drum 18 via line 20. A slurry of boric acid in liquid hydrogenation product is withdrawn from drum 18 and charged via line 21 to air oxidation reactor 22 into which air is charged via line 23. While the air oxidation reactor is shown as a single vessel it will be understood that two or more reactors may be used in series in order to achieve the desired degree of oxidation of the hydrocarbon feed to form alcohols of the hydrocarbon feed in the form of the borate ester, some ketone, carboxylic acid and esters of one or two moles of the alcohol with one mole of the carboxylic acid formed. Temperature control of the air oxidation reactor is accomplished by adjusting the temperature of the feed slurry in drum 18 and by providing suitable cooling means which may be conveniently arranged on each oxidation vessel or between the oxidation reaction stages or vessels. The off-gas from the air oxidation reactors is withdrawn via line 24, cooled in condenser 25 and discharged into separator 26 from which the nonaqueous condensate is recycled via line 27 to the reactor. The spent air may be discharged to the atmosphere or, if desired, passed via line 28 through a second condenser 29 and separator 30 before discharge to the atmosphere. The condensate from separator 30 may be recycled to the reactor 22 or conveniently discharged into recycle line 62 for addition to the hydrogenation feed drum. Any water separated out in either drums 26 or 30 is withdrawn from the system and discarded.

As previously mentioned, when oxidation of cyclododecane to cyclododecanol is the reaction covered here, the olefinic feed, cyclododecatriene, may be introduced via line 10a into the vapor going to condenser 29 and drum 30. In that case, of course, the liquid from drum 30 is not returned to the oxidation reactor 22, but is fed, via stream 62, into the hydrogenation circuit.

The reason for this selection of a feed point for cyclododecatriene is the fact that cyclododecane has a melting point of 61° C., while cyclododecatriene malts only at −15° C. Hence, injection of the triene ahead of cooler 29 permits lower temperatures, and hence higher cyclododecane recoveries in the presence of the triene than in the absence of this low-melting material, without encountering solidification problems in cooler 29 or drum 30.

The liquid products from the air oxidation reactor 22 are fed via line 31 through a heater 32 into borate ester flash drum 33 (which may be a series of drums). In flash drum 33, about 95% of the unoxidized feed hydrocarbons and about 90% of the ketone product from the air oxidation are vaporized away from the nonvolatile borate esters of the formed alcohols. This operation is conducted at a rather high vacuum, i.e., about 50 mm. Hg pressure absolute to maintain the temperature low enough to minimize cracking or decomposition of the borate esters. The vaporized materials are taken overhead from flash drum flash drum 33 via line 34, condensed in heat exchanger 35 and discharged into borate ester flash overhead drum 36 preparatory to recycling the same to the hydrogenation step.

The borate ester product is withdrawn as bottoms from flash drum 33 and pumped via line 37 to borate ester hydrolysis drum or section 40. Water is added via line 38 to the borate ester in the transfer line or the hydrolysis drum to split the borate ester and form two phases, an aqueous one containing the boric acid and an organic one containing the free alcohol. While this is shown as a single drum, an advantageous arrangement can be two drums which are operated countercurrently to effect better hydrolysis and splitting of the boric acid solution and alcohol phases formed. The aqueous phase or boric acid solution is withdrawn via line 41 and transferred to suitable facilities for the recovery of the boric acid.

The organic phase is withdrawn via line 42, passed through heater 43 and discharged into alcohol vaporizer wherein a separation is effected between the more volatile alcohol product and, principally, the higher boiling esters of the formed alcohols and the formed acids. The higher boiling esters are removed as bottoms from vaporizer 45 and passed through line 46 to reactor 47 wherein the aforesaid esters are saponified by means of sodium hydroxide or other suitable alkali supplied via line 48. The saponification reaction mixture is discharged via line 49 into separator 50. The sodium or other alkali salts are withdrawn from separator 50 via line 51 and discharged to the sewer. The alcohols released by the saponification are withdrawn from separator 50 via line 52 and discharged into line 42 for recycle to the alcohol vaporizer.

The more volatile alcohol product and the residual unoxidized hydrocarbon are taken overhead from alcohol vaporizer 45 and discharged via line 53 into the recycle tower feed drum 54 from which it is charged, via line 55, to a small, packed, fractionating tower 56. The alcohol product is withdrawn as a bottom stream via line 57 and passed to product storage with a portion of the product recycled via line 58 and reboiler 59 into the bottom of the fractionating tower 56.

The unoxidized hydrocarbon feed materials are taken overhead from tower 56 via line 60 and conveyed to suitable condensing means and storage means, such as condenser 35 and borate ester flash overhead drum 36 wherein they can be combined with the materials taken overhead from the borate ester flash drum 33. Some of the liquid material is withdrawn from drum 36 and recycled via line 61 to the top of fractionating tower 56 to serve as reflux or, of course, separate reflux means can be provided at tower 56.

The major proportion of the liquid material is withdrawn from drum 36 and, in accordance with this invention, recycled via line 62 to the hydrogenation feed drum 11 and thence to the hydrogenation reactor 14. The essence of the present invention is in the combination of steps which includes maintaining a low level of conversion in the air oxidation reactor 22 to obtain high selectivity to the desired alcohol, a high ratio of alcohol/ketone and acid formed, by flashing of the oxidation reaction mixture under carefully controlled conditions to obtain a large volume of unoxidized hydrocarbon material for recycle to the hydrogenation reactor to effectively control the hydrogenation temperature, to hydrogenate any olefins or ketones formed in the oxidation or during flashing, e.g., by borate ester decomposition, back to the paraffins or alcohols, and effect the reduction of oxidation inhibitors in a paraffin feed when such is employed, respectively.

The present invention is applicable to any boric acid modified oxidation by utilizing the fact that the volatility of the borate esters is lower than most of the starting materials. It is most advantageously applied where olefinic feed stocks react with hydrogen rather energetically under the hydrogenation reaction conditions applied. It can, for example, be used in processes wherein benzene is hydrogenated to cyclohexane, and then air oxidized to cyclohexanol and cyclohexanone, in processes wherein $C_5$–$C_{20}$ olefins or diolefins are hydrogenated to the corresponding paraffins and then air oxidized principally to the corresponding alcohols. This invention is particularly adapted to the conversion of $C_8$–$C_{12}$ olefins, and most particularly the cyclic dimers and trimers of conjugated diolefins and specifically 1,5-cyclooctadiene and 1,5,9-cyclododecatriene to cyclooctanol and cyclododecanol respectively. The later, a preferred material, may be readily prepared by trimerizing butadiene-1,3 with an alkyl metal type catalyst as disclosed in Angewandte Chemie, v. 69, No. 11:397 (June 7, 1957). Although four stereoisomers of 1,5,9-cyclododecatriene are theoretically possible, only two appear to be produced by the above process. These are the cis, trans, trans form having a melting point of −18° C. and the trans, trans, trans form having a melting point of 34° C. Either of these, or mixtures of both, are suitable for use in the present process and for convenience will hereinafter be referred to as CDT.

In another embodiment, the present invention may also be used where the feed stock is nonolefinic, such as in the oxidation of straight chain paraffins, e.g., $C_5$–$C_{20}$ paraffins, preferably $C_6$–$C_{12}$, more preferably $C_8$–$C_{12}$ paraffins. In this latter embodiment, it would appear that hydrogenation of the recycle stream is alone necessary. However, it has been surprisingly found that hydrogenation of the fresh paraffin feed is highly beneficial while hydrogenation of the recycle and the feed may be carried out separately or in separate zones, the hydrogenation may also be carried out in the same zone or the same vessel. The benefits of including the feed in a hydrogenation step reside in the elimination of certain impurities which, if present during boric acid oxidation, seriously impair the oxidation reaction, e.g., necessitate long induction periods and reduce selectivity. These impurities are generally present in the form of aromatic compounds such as monocyclic aromatics, e.g., dodecyl benzene, dicyclic aromatics, e.g., octyl naphthalene, phenols, e.g., 2,6-di-t-butyl paracresol, and find their way into the feed by the method in which straight chain paraffin feeds are prepared. Straight chain paraffins are normally obtained by recovering a petroleum fraction boiling in a range corresponding to the desired carbon number. The fraction is then treated to remove isoparaffins, aromatics, etc., for example, by contact with a molecular sieve which preferentially adsorbs normal paraffins. The normal paraffins are then displaced from the sieve, e.g., by ammonia, and recovered with only small amounts of aromatic contaminants. Such a process is generally capable of producing normal paraffins of a sufficient purity for most purposes. However, it has been found in boric acid oxidation the total aromatic level should generally be below about 1 wt. percent based on fresh paraffin feed, and is preferably below about 0.2 wt. percent, more preferably below about 1000 p.p.m., by weight based on fresh paraffin feed. Thus, by hydrogenating the feed, the oxidation process proceeds more smoothly and aromatic contaminants are reduced and rendered ineffective.

The hydrogenation of the feed, either paraffinic (which may contain aromatics) or olefinic, and the recycle stream containing ketones and olefins is effected with any active hydrogenation catalyst such as nickel on alumina or kieselguhr, preferably made by the reduction of nickel oxide or a nickel salt, such as the carbonate deposited on the support. Reduced metal catalysts, e.g., transition metals reduced by organoaluminum compounds, such as those described in Canadian Pat. 697,780 and U.S. Pat. 3,205,270, are also preferred for their ability to hydrogenate carbonyls, olefins, and aromatics. The catalyst may be 55% Ni on kieselguhr, with a ratio of reduced Ni to total Ni 0.5–0.65. Other suitable hydrogenation catalysts are platinum, palladium, Raney nickel, cobalt molybdate, nickel-tungsten sulfide and the like. The hydrogenation reaction conditions are:

|  | Broad range | Preferred |
|---|---|---|
| Temperature, ° C | 100–250 | 150–200 |
| Pressure, p.s.i.g. | 15–1,000 | 200–400 |
| Recycle/feed ratio | 5–25/1 | 10–15/1 |

The large amount of recycle allows adiabatic operation of the hydrogenation reactor with the high heat of hydrogenation serving to raise the reactor contents from an inlet temperature of about 130–150° C. to about 175–225° C. outlet temperature. The hydrogenation conditions are controlled to effect essentially complete conversion of the olefinic feed to the corresponding saturated hydrocarbons and of the ketone in the recycle stream to the corresponding alcohol.

The material added to the hydrogenated feed preparatory to charging the same to the air oxidation step is, for convenience, termed a boric acid compound and includes boric acid per se, i.e., $H_3BO_3$ and boron-containing compounds which generate boric acid upon contact with water, e.g., boric oxide, i.e., $B_2O_3$; borate esters such as trimethyl borate, triethyl borate, tributyl borate, etc., alkyl boric acids, i.e., $R_2BOH$ (borinic acids) and $RB(OH)_2$ (oronic acids) wherein R is an alkyl radical preferably a $C_3$–$C_8$ alkyl radical; and the esters of borinic and boronic acids with $C_1$–$C_4$ alcohols. Of these, boric acid is preferred.

In general, the amount of boric acid compound employed should be in excess of the amount that would be stoichiometrically equivalent to the number of hydroxyl groups to be introduced. Further, the amount of boric acid compound employed may vary somewhat depending upon the feed stock and the end product desired. Since, in accordance with the present invention only partial conversion, i.e., less than 20%, preferably about 5 to 10% conversion of the paraffinic feed is to be effected in the air oxidation step, the amount of $H_3BO_3$ or equivalent employed should be in the range of from about 0.02 to 0.25 mole of $H_3BO_3$ or equivalent per mole of hydrocarbon feed.

The oxidation of the slurry of boric acid in the hydrocarbon feed is effected with molecular oxygen, e.g., pure oxygen or a gas containing molecular oxygen, such as air or other mixtures of oxygen and inert gas, typically nitrogen, but air is preferred, at essentially atmospheric pressure, i.e., 0 to 50 p.s.i.g. for compounds above $C_{10}$, and higher pressures, up to 250 p.s.i.g., for compounds of lower molecular weight, and at temperatures in the range of from about 125 to 200° C., preferably about 160° C. in the case of light feed stocks, such as cyclohexane, operating pressure has to be kept sufficiently high to maintain the liquid phase in which the reaction occurs to avoid excessive boil-up and reflux at the reaction temperature of 125–175° C. In these cases, reaction pressures may be 150–200 p.s.i.g. Temperature control of the oxidation reactors is effected by control of the temperature of the feed, by cooling off-gas from the reactor and recycling condensate and/or by providing suitable heat exchangers within the reactors, in pump-around service, or in the transfer lines between stages.

Further, showing the advantage of an integrated process employing hydrogenation of the recycle, it was found, during cyclododecane oxidation, for example, at 10% conversion, there was a selectivity of about 4 mole percent to light unknowns (which go overhead at the flash) but upon hydrogenation these unknowns were converted either to cyclododecane, cyclododecanol, or cyclododecanone and their buildup is prevented.

The borate ester flash drum is operated under a relatively high vacuum, for example, 2 to 500 mm. Hg pressure, preferably 5–100 mm., more preferably 5–50 mm. Hg pressure in order to maintain the temperature low enough to minimize cracking or decomposition of the borate ester.

The temperature in the flash drum should be as high as possible in order to maximize the removal of unconverted feed stock. Thus, it is generally desirable to operate at temperatures that will keep the paraffin concentration in the bottom below about 1 wt. percent and more preferably below about 0.5 wt. percent. The substantially complete removal of paraffins is necessitated because of the relative closeness in boiling points between the various paraffins and the desired alcohols. Consequently, in order to produce high purity alcohols such as are required for conversion to difunctional polymer intermediates, paraffins must be substantially completely removed. It will be recognized by those skilled in the art that the flashing temperatures will vary with the molecular weight of the feed and optimum flashing temperatures will be easily determined. For example, in the case of cyclododecane oxidation, flash temperatures of 160–200° C. are preferred, more preferably 160–170° C. However, as the flashing temperatures increase, the tendency of the borate ester to decompose and/or crack also increases. The effect of borate ester decomposition and/or cracking is to produce light color forming precursors, e.g., olefins which go overhead, are recycled and, in the absence of a hydrogenation on the recycle, degenerate to acids and other impurities tending to reduce the over-all selectivity and efficiency of the process. Thus, the combination of process steps presented herein provides an integrated process for preparing high quality alcohols from either an olefinic or paraffinic feed.

TABLE I.—FLASH OF BORIC ACID MODIFIED CYCLODODECANE OXIDATE

| Run No. | 1 | 2 |
|---|---|---|
| Pressure, mm. Hg | 50 | 50 |
| Temperature, ° C | 160 | 170 |
| Overhead product, as percent of Constituent in feed: | | |
| Cyclododecane | 93 | 97 |
| Cyclododecanone | 75 | 81 |
| Cyclododecanol (as such, or as borate) | 0 | 0 |
| Cyclododecanol recovery in bottoms, percent | 99 | 94.5 |
| Unsaturates (as cyclododecene) in feed, percent | 0.5 | 0.5 |
| Unsaturates (as cyclododecene) in overhead, percent | 0.7 | 1.2 |

This table shows that decomposition of the borate ester occurred at a flash temperature above 160° C.

The best flash temperature, i.e., to obtain high percent removal of unconverted feed, will depend on the specific feed stock involved. While it will usually be desirable to go as close to the decomposition temperature of the borate ester as possible, this high temperature may actually not be necessary in the case of lighter hydrocarbons. Also, flash pressure can be adjusted to regulate the percent recovery of unconverted feed. While a low flash pressure increases the recovery, it also leads to larger equipment and condensing difficulties, especially with light or high-melting feed stocks.

Based on the data shown in Table I, extrapolation to a $C_6$ system indicates that flashing at 250–300 mm. Hg should be adequate to recover 95–99+% of the unconverted feed stock overhead. Specifically, using 20% conversion per pass in the oxidation, the following recoveries will be realized in the $C_6$ system.

TABLE II.—$C_6$ FLASH

| Flash temperature, ° C.: | Percent of unconverted $C_6$ going overhead |
|---|---|
| 150 | 99+ |
| 120 | 98 |
| 100 | 96 |

Thus, in the borate ester flash drum about 95% of the unreacted hydrocarbon feed and about 90% of the ketone product formed are taken overhead and condensed preparatory to recycling the same to the hydrogenation feed drum.

In the view of the relatively low conversion per pass in the air oxidation step and the flashing off of substantially all of the unoxidized feed and the volatile ketone product, the volume of material supplied to the borate ester hydrolysis is quite small or certainly greatly reduced over operations in which the entire air oxidation reaction mixture is charged to the hydrolysis step since only the borate ester of the formed alcohol, a small amount of unoxidized feed hydrocarbon and possibly a very small amount of high boiling ester are charged to the borate ester hydrolysis. Hydrolysis of the borate ester is readily effected by the addition of from about 175 down to 15 wt. percent of water based on the alcohol borate ester and heating to about 60 to about 20° C. with agitation. The higher quantity of water goes with the lower temperature due to the low solubility of boric acid in 60° C. water compared to the higher temperature ranges. Of course, more water than shown can be used at the higher treat temperatures. Upon completion of the hydrolysis the mixture is allowed to settle into an organic layer and an aqueous layer, the former being subjected to distillation to separate the residual unreacted hydrocarbon for recycle to the hydrogenation step, the desired alcohol product as a separate fraction and a small amount of high boiling ester product which is separated as bottoms and subjected to saponification with aqueous caustic soda (10–25 wt. percent strength) at about 90–100° C.

The following examples are illustrative of the present invention.

1,5,9-cyclododecatriene (CDT) prepared as described in Angewandte Chemie, v. 60, No. 11:397, June 7, 1957 is diluted with a recycle stream of about 98 mole percent cyclododecane (CDA) and about 1–2 mole percent cyclododecanone (CDone) to reduce the CDT concentration to slightly below 8%. This mixture is charged to a hydrogenation reactor containing a nickel on kieselguhr catalyst maintained at about 400 p.s.i.g. The feed is charged to the reactor at a temperature of about 285° F. and at a space velocity of 0.5 v./v./hr. based on CDT plus CDA recycle discussed above. A substantial excess of hydrogen is supplied to the reactor. The outlet temperature of the reactor is in the range of about 360–400° F. Conversion of CDT to CDA is substantially complete, the conversion of CDone to CDol is 80–90% complete.

Boric acid in an amount sufficient to form a 3 wt. percent slurry is added to the liquid hydrogenation product and the resultant mixture is subjected to oxidation with air at near atmospheric pressure and at a temperature of about 320° F. In the air oxidation, the feed stream is converted to a mixture of cyclododecanol (in the form of the borate ester) cyclododecanone, dodecanedioic acid and $C_{36}$ ester formed from two moles of cyclododecanol and one mole of dodecanedioic acid. Conversion of cyclododecane is about 8% per pass.

The oxidation reaction products are discharged into the borate ester flash drum which is maintained at the same temperature as in the air oxidation zone but under high vacuum (50 mm. Hg pressure). In the flash drum, 95% of the unreacted cyclododecane and 90% of the cyclododecanone product are vaporized away from the non-volatile cyclododecyl borate (borate ester of cyclododecanol). The volatilized materials are taken overhead and condensed for recycle to hydrogenation and the bottoms are pumped to hydrolysis where it is split into an aqueous phase containing the boric acid and an organic one containing free cyclododecanol and small amounts of the $C_{36}$ ester which is saponified with caustic soda and the cyclododecanol freed thereby is combined with the main stream of cyclododecanol which is fractionated to remove residual cyclododecane and cyclododecanone for addition to the main recycle srteam to the hydrogenation step from the cyclododecanol product of about 98% purity.

Figure 2:
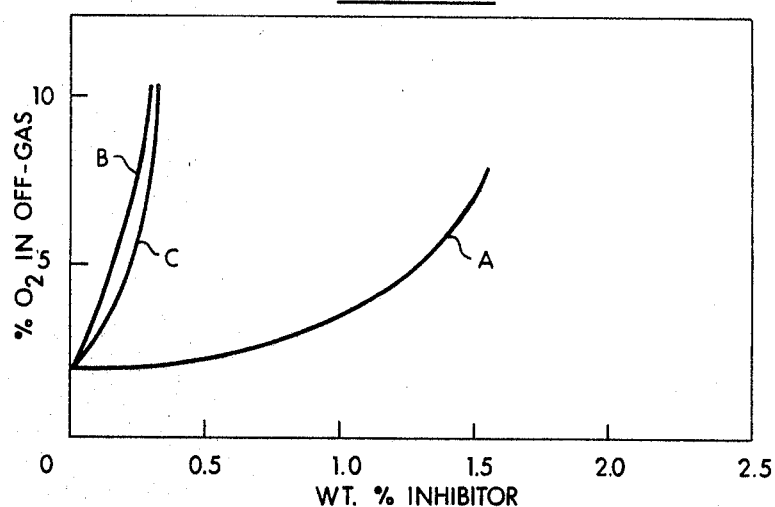

FIG. 2 graphically shows the effect of aromatic inhibitors present in a parafin feed stream. Thus, line A is indicative of a monocyclic aromatic, e.g., dodecyl benzene; line B, a dicyclic aromatic, e.g., octyl naphthalene; and line C, a phenol, e.g., 2,6-di-t-butyl paracresol. As the amount of inhibitor increases, the percent oxygen in the off-gas from a boric acid oxidation reactor increases, evidencing a lack of oxidation of the feed paraffin. It can also be seen that the phenol and dicyclic aromatic present in amounts of about 0.2 wt. percent on feed are highly detrimental to the oxidation reaction, and these should be preferably below about 350 p.p.m.

Figure 3:
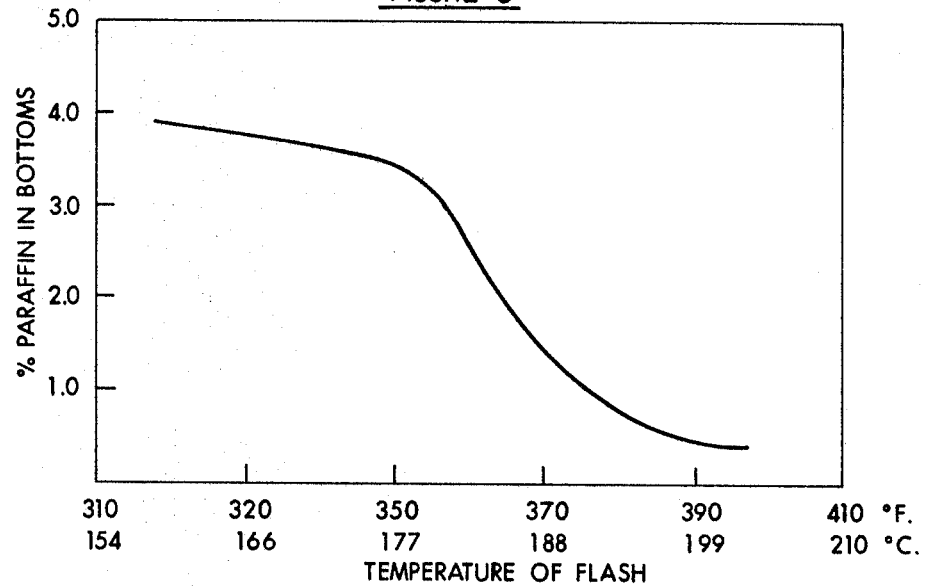

FIG. 3 graphically shows the effect of flashing temperature on a CDA oxidation. The curve was derived from data obtained by flashing two streams, one containing 66 wt. percent paraffin, the other containing 12 wt. percent paraffin (initial paraffin concentration having no effect on results), at 10 mm. Hg vacuum. The graph clearly shows that increasing temperatures sharply affect the paraffin concentration in the bottoms and a 1.0 wt. percent paraffin bottoms is obtained at about 370° F. (188° C.).

The data shown in Table III, below, is to be contrasted with FIG. 3. Table III shows the removal of unreacted cyclododecane from a borate ester at 50 mm. Hg and at 320° F. (160° C.) and 338° F. (170° C.), each run at 7.5 minutes residence time. It should be particularly noted that a permanganate unsaturation test showed an increase in unsaturated materials from 0.5 to 0.7 wt. percent (calculated as cyclododecene) at 160° C., but from 0.5 to 1.2 wt. percent at 170° C. The increase in unsaturation is attributed to decomposition of the borate ester thereby liberating cyclododecene. Borate ester decomposition is also indicated by the large increase in ester concentration. FIG. 3, however, shows that the proper paraffin removal can only be obtained at about 190° C. and, therefore, the unsaturation in the product would be expected to increase.

TABLE III.—EFFECT OF FLASH TEMPERATURE ON DECOMPOSITION OF BORATE ESTER

| Bottoms temp., ° C. | Wt. percent unsaturation | | Percent recovery | | | | |
|---|---|---|---|---|---|---|---|
| | Feed | Product | CDA | Alc. | Ket. | Acids | Esters |
| 160 | 0.5 | 0.7 | 99.3 | 99 | 95 | 97.4 | 99 |
| 170 | 0.5 | 1.2 | 101 | 94.5 | 97 | 95 | 150 |

Again, the integrated process presented in this invention is seen to depend on the hydrogenation of the recycle feed. Thus, it is only by employing a hydrogenation on the recycle that a high temperature flash can be used. And it is the combination of these steps that gives life to the invention.

The foregoing specification contains a limited number of embodiments of the present invention. It will be understood that this invention is not limited thereto and that numerous variations are possible without departing from the scope of the following claims.

What is claimed is:

1. A process for preparing alcohols which comprises adding boric acid or a compound which generates boric acid upon contact with water to a feed containing a major proportion of saturated hydrocarbons, subjecting the resultant mixture to oxidation with molecular oxygen to convert at most 20 wt. percent of the hydrocarbons in the feed to oxidation products comprising a mixture of the borate ester of the corresponding alcohols, ketones, carboxylic acids, and esters of the carboxylic acids with the formed alcohols, vacuum flashing the oxidation reaction mixture to separate overhead the major proportions of the unoxidized hydrocarbons and the ketone products from the less volatile ester products, condensing the materials taken overhead in the vacuum flashing, subjecting the condensate to hydrogenation to convert ketones therein to alcohols and to saturate olefins, and recycling a portion of the hydrogenated condensate to the air oxidation step.

2. The process of claim 1 wherein the hydrocarbon feed contains a minor proportion of aromatics and the feed is hydrogenated to reduce the aromatic concentration to less than about 1 wt. percent, prior to mixing with the boric acid compound.

3. The process of claim 2 wherein the hydrocarbon feed is mixed with the condensate and the mixture is hydrogenated.

4. The process of claim 1 wherein the bottoms from the vacuum flashing contains less than about 1 wt. percent saturated hydrocarbons.

5. The process of claim 1 wherein the feed is a straight chain paraffin.

6. A process for preparing alcohols from straight chain paraffins containing a minor proportion of aromatics which comprises charging the paraffinic feed stock to a catalytic hydrogenation zone to reduce the aromatic content to below about 1 wt. percent based on feed, adding to the hydrogenated feed boric acid or a compound, which generates boric acid upon contact with water subjecting the resultant mixture to oxidation with molecular oxygen to convert at most about 20 wt. percent of the hydrocarbons in the feed to oxidation products comprising a mixture of the borate ester of the corresponding alcohols, ketones, carboxylic acids, and esters of the carboxylic acids with the formed alcohols, vacuum flashing the oxidation reaction mixture to separate overhead the unoxidized paraffins and the ketone products from the less volatile ester products, the bottoms containing less than about 1 wt. percent paraffins, condensing the materials taken overhead, and recycling the condensate the the hydrogenation zone in admixture with the fresh paraffin feed in a ratio of from about 5 to 25 parts per part of fresh paraffin feed.

7. A process for preparing alcohols which comprises charging an olefinic hydrocarbon feed to a catalytic hydrogenation zone to essentially saturate the olefinic feed, adding boric acid or a compound which generates boric acid upon contact with water to the hydrogenated feed, subjecting the resultant mixture to oxidation with molecular oxygen to convert at most about 20 wt. percent of the hydrocarbons in the feed to oxidation products comprising a mixture of borate esters of the corresponding alcohols, ketones, carboxylic acids, and esters of the carboxylic acids with the formed alcohols, vacuum flashing the oxidation reaction mixture to separate overhead the major proportion of the unoxidized hydrocarbons and ketone products from the less volatile ester products, condensing the materials taken overhead in the vacuum flashing, and recycling the condensate to the hydrogenation zone in admixture with the fresh olefin feed in a ratio of from about 5 to 25 parts per part of fresh olefin feed.

8. The process of claim 7 wherein the bottoms from the vacuum flashing contains less than about 1 wt. percent of saturated hydrocarbons.

9. The process of claim 7 wherein the ester products contained in the bottoms from the vacuum flashing are hydrolyzed to form free alcohols.

10. The process of claim 9 wherein the olefinic feed is cyclododecatriene which is hydrogenated to cyclododecane and the alcohol product is cyclododecanol.

11. The process of claim 10 wherein the vacuum flashing is carried out at pressures ranging from about 25 to 100 mm. Hg absolute and temperatures ranging from about 160° to 200° C.

12. The process of claim 10 wherein off-gases from the oxidation reactor are partially cooled to separate non-aqueous condensate for recycle to the oxidation reactor whereupon the partially cooled off-gases are combined with fresh cyclododecatriene feed and further cooled to maximize the recovery of cyclododecane from said off-gases while avoiding the problem of solidification of the cyclododecane in the condensing and separation equipment.

13. The process of claim 10 wherein hydrogenation is effected at about 100° to 250° C. and at about 50 to 1000 p.s.i.g. in the presence of a hydrogenation catalyst, boric acid added in amounts of about 0.02 to 0.25 mole per mole of cyclododecane, oxidation is effected with air at temperatures ranging from about 100° to 300° C. and pressures of about atmospheric to about 50 p.s.i.g., and vacuum flashing of the oxidation products is effected at about 5 to 50 mm. Hg and at about 160° to 170° C.

References Cited

UNITED STATES PATENTS

| | | |
|---|---|---|
| 2,334,100 | 11/1943 | Ipstieff et al. |
| 2,597,842 | 5/1952 | Linn. |
| 2,615,055 | 10/1952 | Linn. |
| 2,721,180 | 10/1955 | Lawrence et al. |
| 3,108,142 | 10/1963 | Reppe et al. _____ 260—666 |
| 3,109,864 | 11/1963 | Fox et al. |
| 3,233,704 | 2/1966 | Helby et al. |
| 3,279,552 | 3/1966 | Feder et al. |

OTHER REFERENCES

Bashkirov et al.: "Khim Nauki Prom.," vol. 4 (1959), pp. 607–12.

Morrison et al.: "Orangic Chemistry" (1959), p. 623.

Bashkirov et al.: "World Petroleum Congress," 5th proceedings, N.Y. vol. 4 (1959), pp. 175–193.

Bashkirov et al.: "Chem. Abstracts," vol. 57 (1962), pp. 684–5.

LEON ZITVER, Primary Examiner

J. E. EVANS, Assistant Examiner

U.S. Cl. X.R.

260—666, 643, 667, 683.9, 638, 682, 462, 537, 631, 639